US011089067B2

(12) United States Patent
Mao et al.

(10) Patent No.: US 11,089,067 B2
(45) Date of Patent: Aug. 10, 2021

(54) PROGRESSIVE RENDERING

(71) Applicant: INTERNATIONAL BUSINESS MACHINES CORPORATION, Armonk, NY (US)

(72) Inventors: Xiao Xia Mao, Shanghai (CN); Yin Qian, Shanghai (CN); Zhen Hong Ding, Shanghai (CN); Dong Ni, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/271,990

(22) Filed: Feb. 11, 2019

(65) Prior Publication Data
US 2020/0259874 A1    Aug. 13, 2020

(51) Int. Cl.
*H04N 21/454*  (2011.01)
*H04L 29/06*   (2006.01)
*H04L 29/08*   (2006.01)
*G06F 3/0484*  (2013.01)
*H04N 21/45*   (2011.01)

(52) U.S. Cl.
CPC ........ *H04L 65/1059* (2013.01); *G06F 3/0484* (2013.01); *H04L 67/10* (2013.01); *H04L 67/306* (2013.01); *H04N 21/454* (2013.01); *H04N 21/4532* (2013.01)

(58) Field of Classification Search
CPC ............... H04N 21/454; H04N 21/466; H04N 21/4532; H04N 21/4542; H04N 21/4545; G06Q 50/01
See application file for complete search history.

(56) References Cited

U.S. PATENT DOCUMENTS

| 5,757,417 | A  | * | 5/1998  | Aras .................. H04N 7/17318 348/569 |
| 8,185,921 | B2 | * | 5/2012  | Candelore ............ H04N 5/4401 348/435.1 |
| 8,949,878 | B2 | * | 2/2015  | Dimitrova .............. H04N 7/163 709/229 |
| 9,445,151 | B2 | * | 9/2016  | Greene ............. H04N 21/4542 |
| 9,471,852 | B1 | * | 10/2016 | Feris .................... G06K 9/6269 |
| 9,554,188 | B2 |   | 1/2017  | Felt et al. |
| 9,646,646 | B2 | * | 5/2017  | Davis, III ............ G11B 27/031 |
| 2001/0001159 | A1 | * | 5/2001 | Ford ..................... H04N 7/088 725/25 |

(Continued)

FOREIGN PATENT DOCUMENTS

EP    3096322 A1    11/2016

OTHER PUBLICATIONS

Mell, et al., "The NIST Definition of Cloud Computing," National Institute of Standards and Technology, U.S. Department of Commerce, Special Publication 800-145, Sep. 2011, pp. 1-7.

*Primary Examiner* — Alvin H Tan
(74) *Attorney, Agent, or Firm* — L. Jeffrey Kelly

(57) ABSTRACT

A method, computer system, and computer program product for processing a media content is provided. The present invention may include receiving a request from a user to render a media content, identifying one or more features of the media content, obtaining a profile of the user, and generating a progressive rendering plan for the media content, based on the user's profile and the one or more features of the media content.

13 Claims, 6 Drawing Sheets

(56) References Cited

U.S. PATENT DOCUMENTS

| | | | |
|---|---|---|---|
| 2003/0049014 A1* | 3/2003 | Siddiqui | H04N 21/84 386/261 |
| 2006/0224046 A1* | 10/2006 | Ramadas | A61B 5/0002 600/300 |
| 2009/0089828 A1* | 4/2009 | Carlsgaard | H04N 21/4318 725/28 |
| 2009/0151004 A1* | 6/2009 | Cohen | G06F 16/48 726/27 |
| 2009/0204580 A1* | 8/2009 | Seamon | G06F 16/951 |
| 2012/0222057 A1 | 8/2012 | Sadowsky et al. | |
| 2014/0237501 A1* | 8/2014 | Berrier | H04N 21/4755 725/25 |
| 2015/0181291 A1 | 6/2015 | Wheatley | |
| 2017/0272818 A1* | 9/2017 | Gattis | H04N 21/4415 |
| 2018/0246695 A1* | 8/2018 | Taylor | G06F 40/30 |
| 2019/0318252 A1* | 10/2019 | Shamma | G06N 5/04 |

\* cited by examiner

PROGRESSIVE RENDERING

BACKGROUND

The present invention relates to data processing, and more specifically, to a computer-implemented method, system and computer program product for processing a media content.

Media content such as images, videos, movies and the like can elicit emotional responses from audiences for different segments of the content. Some content may include segments that the audiences may not want to view.

SUMMARY

According to an embodiment, a method, computer system, and computer program product for processing a media content is provided. The present invention may include receiving a request from a user to render a media content, identifying one or more features of the media content, obtaining a profile of the user, and generating a progressive rendering plan for the media content, based on the user's profile and the one or more features of the media content.

These and other features and advantages of the present invention will be described, or will become apparent to those of ordinary skill in the art in view of, the following detailed description of the example embodiments of the present invention.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
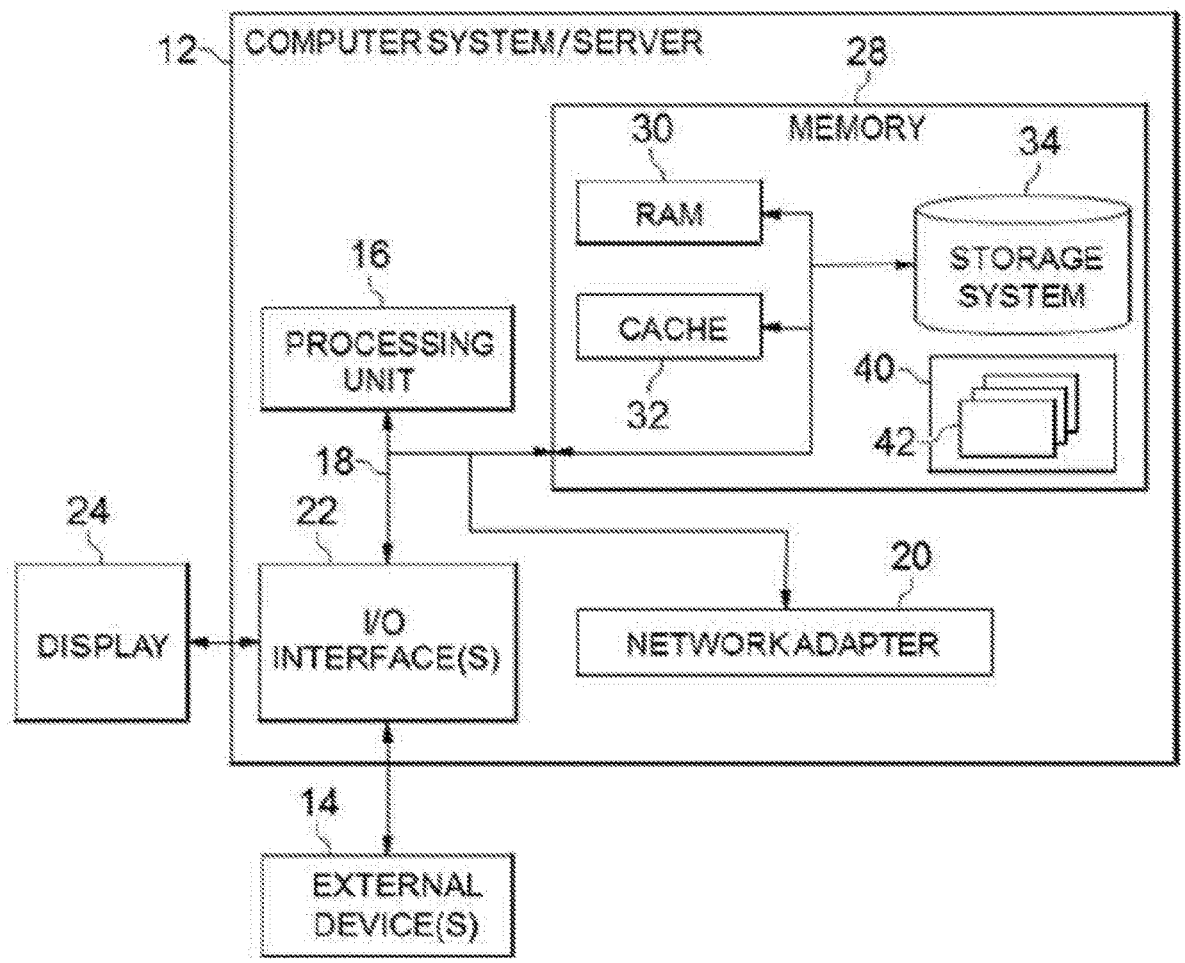
FIG. 1 depicts a cloud computing node according to an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Referring to FIG. 1, a computer system/server 12, which may be accessible in a cloud computing node, is shown in the form of a general-purpose computing device, according to an embodiment. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
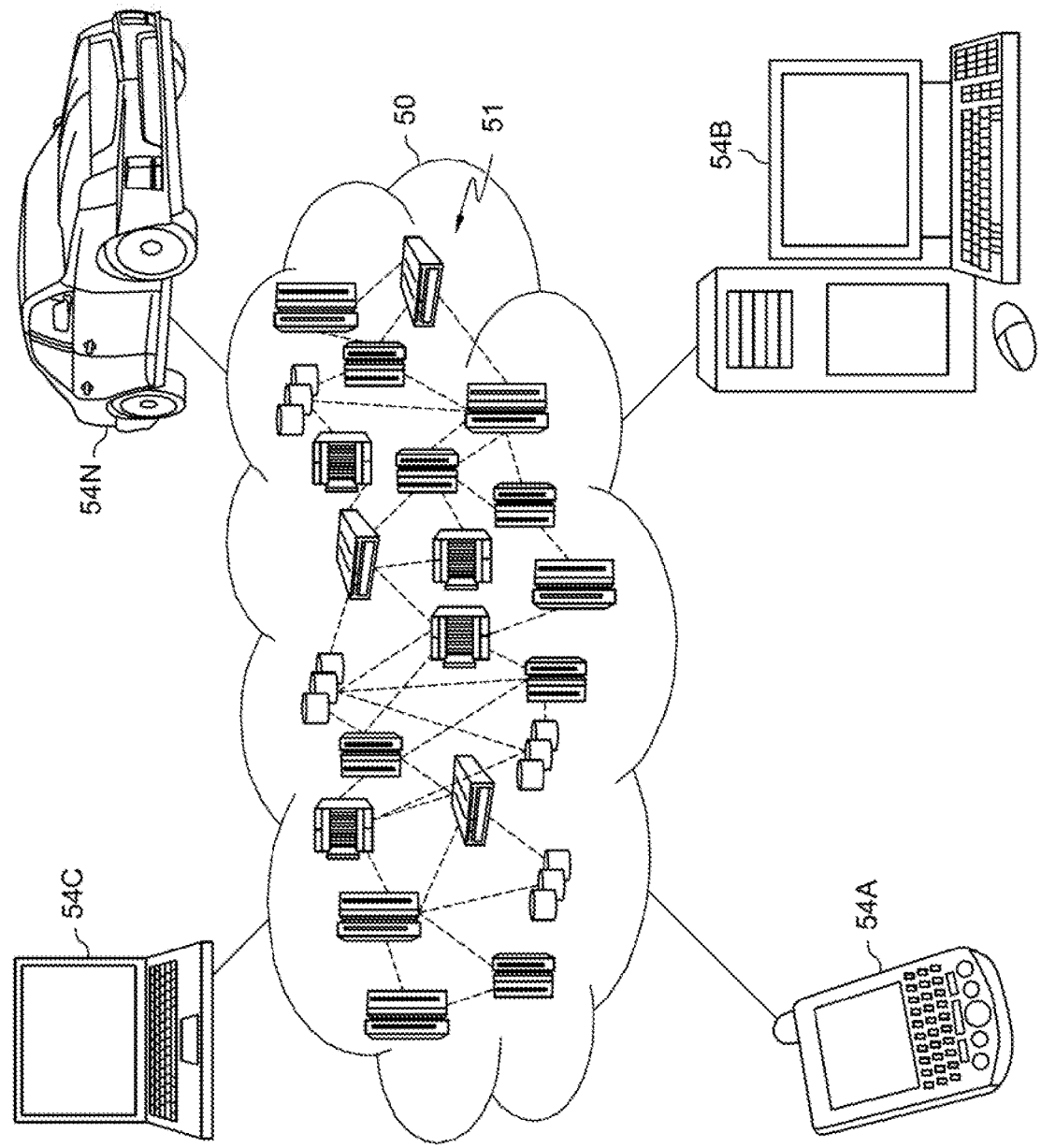
FIG. 2 depicts a cloud computing environment according to an embodiment of the present invention.

Referring to FIG. 2, illustrative cloud computing environment 50 is depicted, according to an embodiment. As shown, cloud computing environment 50 includes one or more cloud computing nodes 51 with which local computing devices used by cloud consumers, such as, for example, personal digital assistant (PDA) or cellular telephone 54A, desktop computer 54B, laptop computer 54C, and/or automobile computer system 54N may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
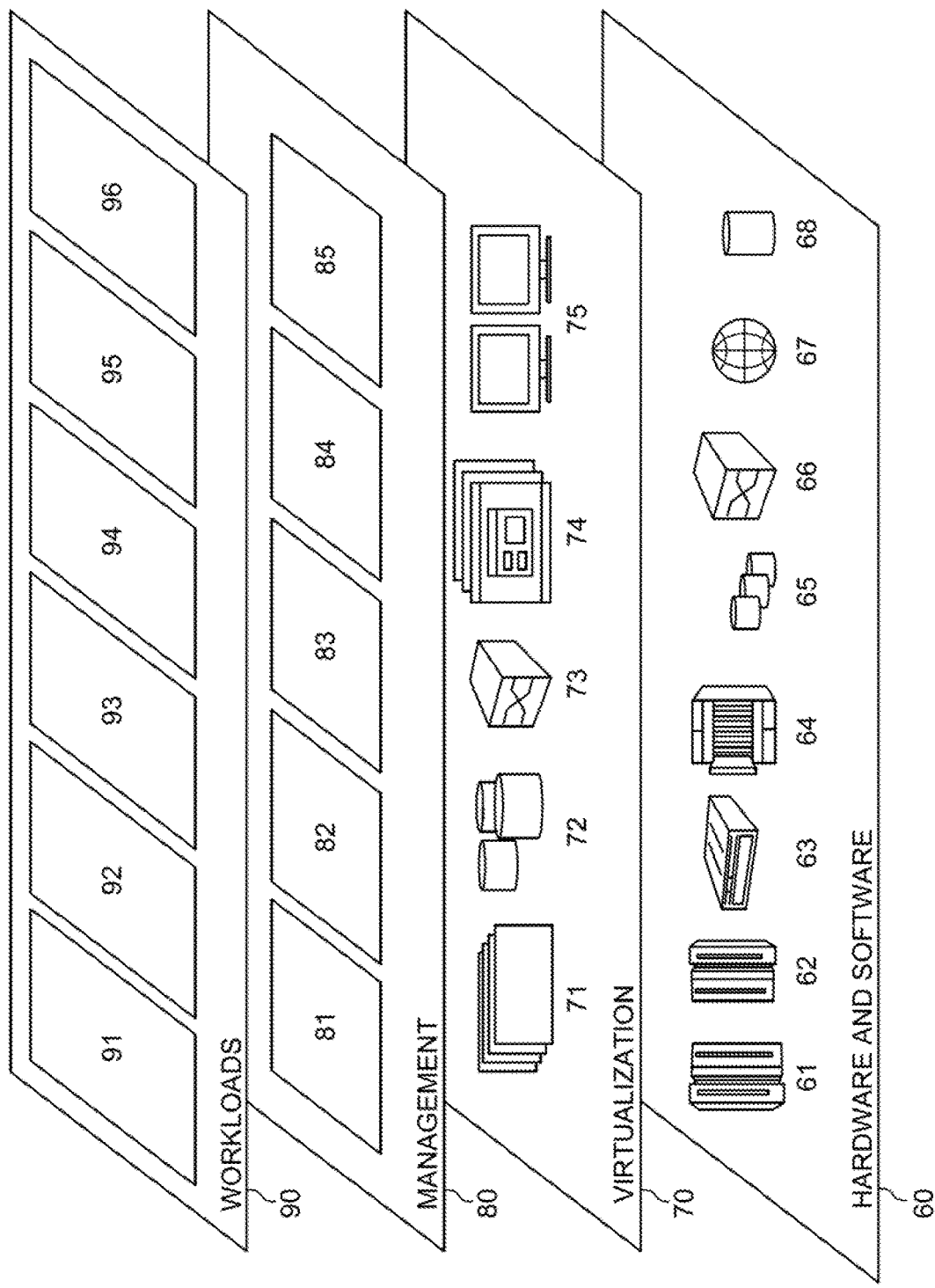
FIG. 3 depicts abstraction model layers according to an embodiment of the present invention.

Referring now to FIG. 3, a set of functional abstraction layers provided by cloud computing environment 50 (as shown in FIG. 2) is shown, according to an embodiment. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In an example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and media content processing 96. Hereinafter, reference will be made to FIG. 4 to FIG. 6 to describe details of the media content processing.

As previously described, media content such as images, videos, movies and the like can elicit emotional responses from audiences for different segments of the content. Some content may include segments that the audiences may not want to view.

Before we start to introduce the embodiments of the present invention, let's imagine some scenarios in our daily life first. The researchers found that mere sight of delicious food stimulates the appetite. Unintentionally being exposed to pictures of delicious food may result in unnecessary consumption of food. For example, for a person who should not have any food at that moment because such as it's a midnight time, he/she is on a diet, or he/she is going to take surgery next morning, etc., a food picture jumping into the person's eyes may make the person feel difficult to resist the temptation from delicious food. In another scenario, pictures and videos of terrorist attacks, explosions, car accidents, and horror movies can be easily found in social media and news. Some persons may have bad feelings after watching these pictures and videos. Children might also be exposed to those terrible scenes.

Although there are some existing solutions which may block scary or bloody scenes, just blocking them may not fit everyone's requirements. Some graphic scenes may psychologically affect certain sensitive individuals while have no impacts to others. Sometimes, a viewer may catch such a scene unintentionally, perhaps while browsing a friend's moment status, chatting with friends in a chatting group, changing channels, or browsing on the Internet. And sometimes the viewer may have a predilection for such scene and would like to view the scene.

Considering the above scenarios, the embodiments of the present invention propose a method, system and computer program product for progressive rendering a media content. A progressive rendering plan would be generated based on a user's profile and the features of the media content. And the media content may be rendered progressively according to the rendering plan. The user may stop the rendering any time the user wants to stop, so as not to view any unwanted content.

Herein the media content may be any digital media that are encoded in machine-readable formats. Digital media can be created, viewed, distributed, modified and preserved on digital electronics devices. Examples of media content include digital images, digital video, video game, web pages and websites, digital audio, etc.

For sake of description, some embodiments of the present invention are described by using an image as an example of a media content. It would be understood that the embodiments of the present invention described below could be equally applied to other media content, such as video, web pages, audio, etc.

Figure 4:
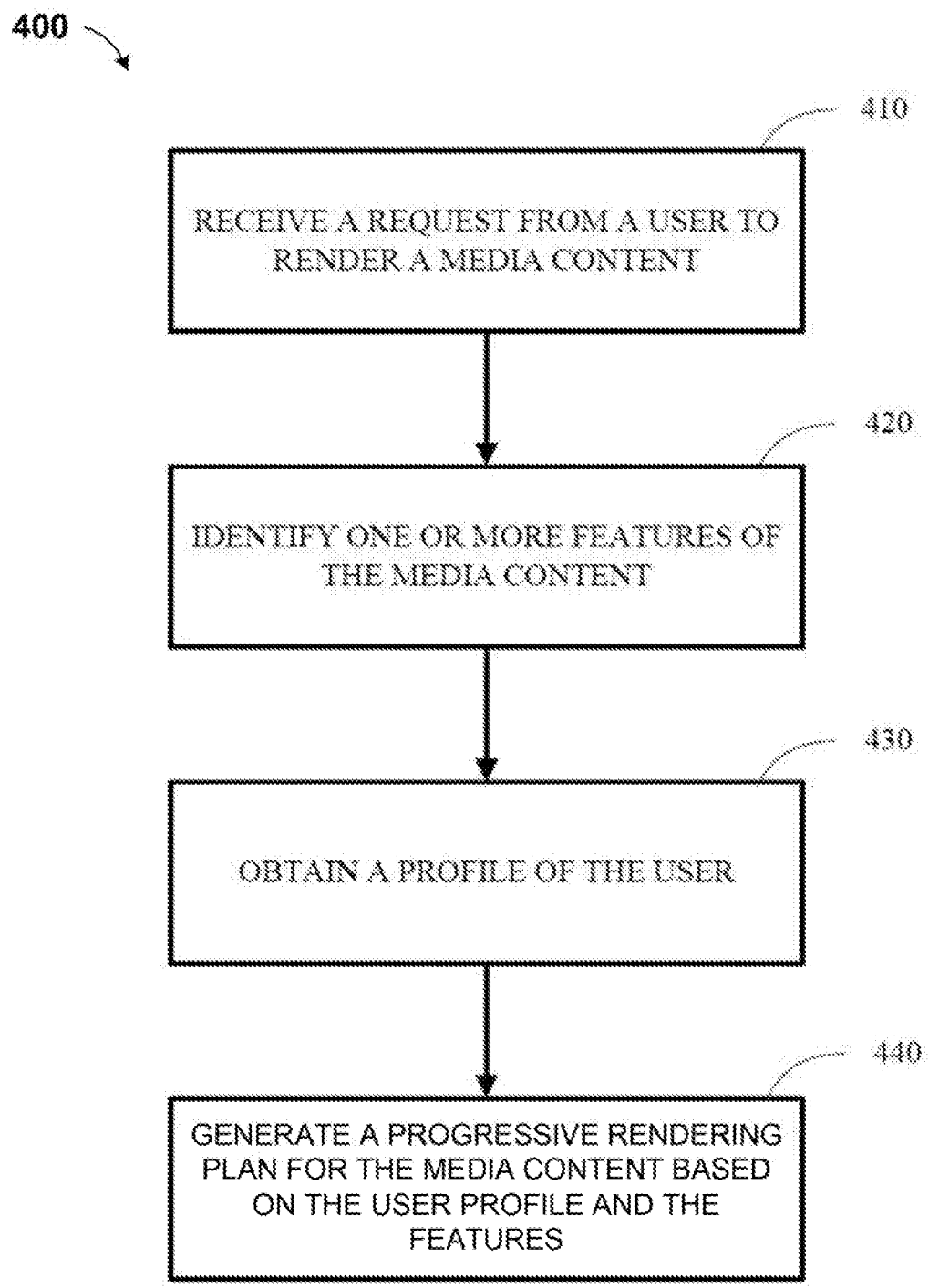
FIG. 4 depicts an example diagram of a method for processing a media content according to an embodiment of the present invention.

Referring to FIG. 4, an example diagram of a method 400 for processing a media content according to an embodiment of the present invention is shown. At block 410, a request is received from a user to render a media content. According to an embodiment of the present invention, the media content may be an image. Alternatively, the media content may be a video or a frame of a video. The media content may also be a web page. According to an embodiment of the present invention, the media content may also include audio information.

At block 420, one or more features of the media content are identified. Various features may be identified for the media content. The features may be identifiers for different human emotions for the media content, such as surprised, shocked, sad, happy, angry, disgusted, etc. The features also may be identifiers or description for subjects shown in an image. And other features may include additional aspects.

The features of the media content may by identified by obtaining tags attached with the media content. The tags of the media content may be input by one or more users manually or decided by a machine learning algorithm automatically. For example, the tags of an image may be decided by reference to an emotion or physiological information from a user viewing the image, such as "scary", "funny", "delicious food", etc.

According to another embodiment of the present invention, the features of a media content may be identified by identifying the content with content recognition technology. For example, for an image, the features of the image may be identified by identifying the objects in the image or the topics and keywords of the image.

At block 430, a profile of the user is obtained. The profile of the user may include various information about the user, including, but not limited to, the user's basic information, the user's preference, the user's latest status, the user's gender, the user's likes and dislikes in terms of media content, etc. According to an embodiment of the present invention, the user's profile may also include pre-defined rendering styles for the user. The user's profile may be input by the user. Alternatively, the user's profile may be obtained based on the user's activities in social media.

Please be noted that the steps in the block 420 and the block 430 shown in succession herein may also be executed substantially concurrently or may be executed in the reverse order.

At block 440, a progressive rendering plan is generated for the media content based on the user profile and the one or more features of the media content. For example, for an image to be rendered, the progressive rendering plan may include changes on contrast, color saturation, brightness, etc. Further, the image may be rendered progressively from vague to district, from part to the whole, etc.

It will be noted that the process as shown in FIG. 4 may be implemented by a computer system either on a client side or on a server side. For a computer system on a server side, the computer system may receive the rendering request from a user device, and then send the generated progressive rendering plan back to the user device for rendering the media content in the user device.

Figure 5:
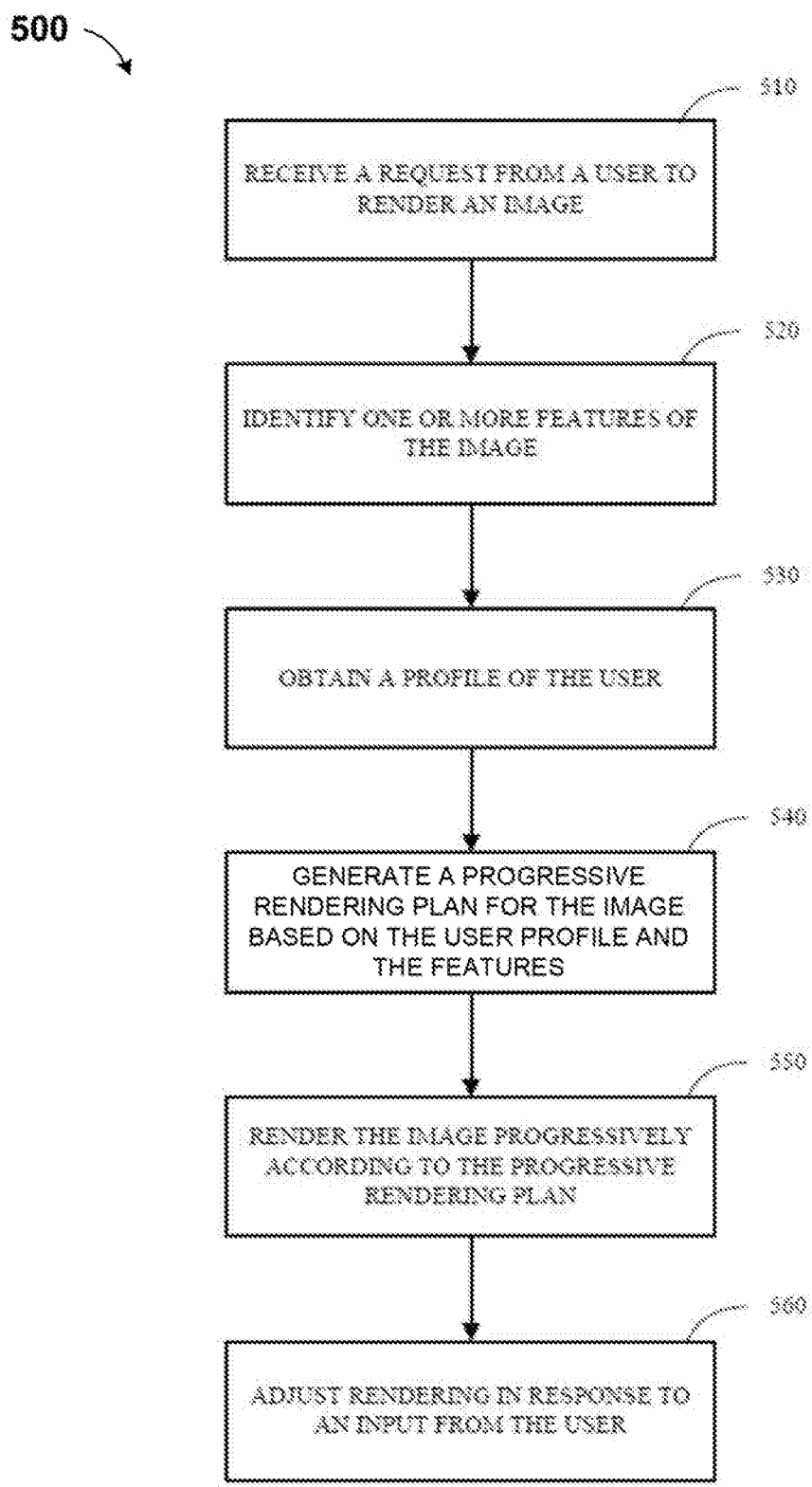
FIG. 5 depicts an example diagram of a method for progressively rendering an image according to another embodiment of the present invention.

Referring to FIG. 5, a method 500 for progressively rendering an image according to an embodiment of the present invention is shown using an image as an example of the media content. The steps in blocks 510-540 of FIG. 5 are similar with those shown in blocks 410-440 of FIG. 4, and the description to those steps are omitted here for the sake of simplicity.

After a progressive rendering plan is generated at the block 540, at block 550, the image is rendered progressively according to the generated progressive rendering plan.

Cascading Style Sheets (hereinafter "CSS"), is a style sheet design language used for describing the presentation of a web page document.

An example of a progressive rendering plan for an image may look like:

1s->2s, CSS 1 (inverted color),
3s->4s, CSS 2 (black and white),
5s->6s, CSS 3 (low contrast),
7s-> . . . , CSS Normal.

According to the above rendering plan, the image may be displayed with color inverted during the 1st second and 2nd second, in black and white form during the 3rd second and 4th second, in low contrast during the 5th second and 6th second, and in normal CSS starting at the 7th second.

Another example of a progressive rendering plan may be a progressive display function as below:

$$F=f_0+v*t,$$

in which, $f_0$=the starting value of the image rendering, initial ($f_0$)=initial (image); v=the progressive rendering speed; t=time.

The starting value $f_0$ and the progressive rendering speed v may change according to the self-learning and self-adaptive adjustment based on the user analysis. It means the successive images will render from the different starting state and will apply different rendering speed after the image sample training. The user analysis contains the user's behavior, preference, and other user's feedback, etc.

At block 560, the rendering of the image is adjusted in response to an input from the user. According to an embodiment of the present invention, the input from the user may be a stop request, and the rendering of the image would be stopped then. According to another embodiment of the present invention, the input from the user may be a suspend request, and the rendering of the image may be suspended then. According to a further embodiment of the present invention, the input from the user may be a resume request, and the suspended rendering of the image may be resumed then.

According to an embodiment of the present invention, the input from the user may be considered for future rendering plan generation for similar media contents. For example, the input from the user may be used to update the user's profile or to update the features of the media content. So next time when similar media content is to be rendered, the rendering plan may be generated based on the updated user profile or the updated features of the media content. Alternatively, a progressive rendering plan is generated for the media content based on the user profile, the one or more features of the media content and the input from the user.

Figure 6:
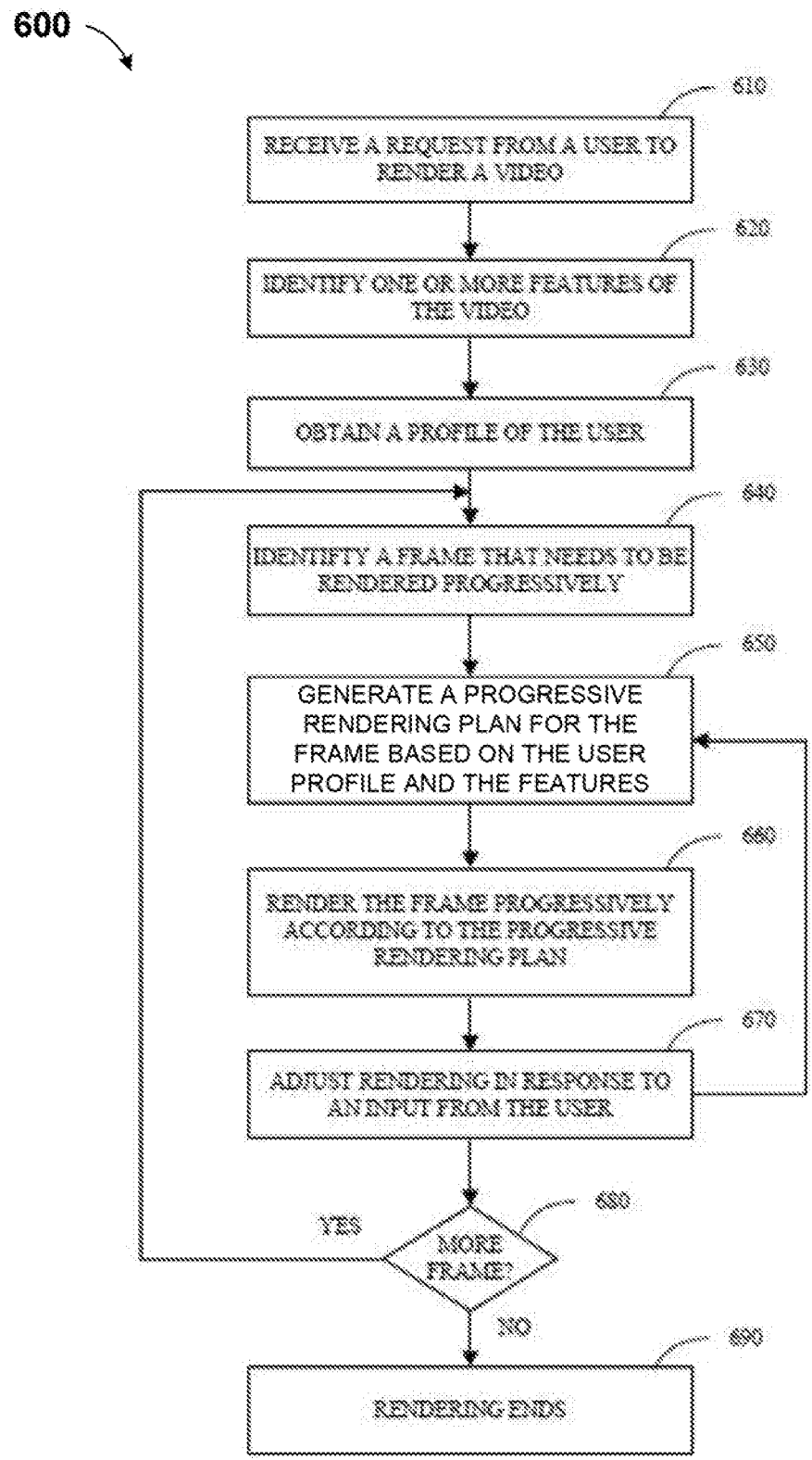
FIG. 6 depicts an example diagram of a method for progressively rendering a video according to another embodiment of the present invention.

Referring to FIG. 6, an example diagram of a method 600 for progressively rendering a video is shown, according to another embodiment of the present invention using a video as an example of the media content. At block 610, a request is received from a user to render a video. The video may include a sequence of frames to be rendered. At block 620, one or more features of the video are identified. The one or more features include features of frames in the video. At block 630, a profile of the user is identified. The steps in blocks 610-630 of FIG. 6 are similar with those shown in blocks 410-430 of FIG. 4, and detailed description to those steps are omitted here for the sake of simplicity.

At block 640, a frame that needs to be rendered progressively is identified based on the user's profile and the one or more features of the video. For example, if the video is a horror movie, maybe only some frames in the video include horror scenes which need to be rendered progressively. Therefore, such frame needs to be identified first, based on the user's profile and the features in the frame.

At block 650, similar with what has been described above, a progressive rendering plan for the frame in the video is generated based on the user's profile and the one or more features of the video in response to the identification.

At block 660, the frame is rendered progressively according to the generated progressive rendering plan. At block 670, the rendering is adjusted in response to an input from the user. For example, if the user thinks the content in a frame is too scary and requests to stop the rendering of the frame at a certain point, the rendering will be stopped accordingly. Then the method will continue to proceed to process the following frames in the video. If it's decided at block 680 that there are more frames in the video to be rendered, the process will go back to the block 640 to identify further frames to be rendered progressively. Furthermore, the input from the user at the block 670 may be considered when a progressive rendering plan is generated for a subsequent frame in the video. That is, a rendering plan for the sequent frame in the video is generated based on the progressive rendering plan of the previous frame and the input for the user. For example, if the user stops the rendering of a frame at a certain point, the following frames with same features such as same topic/keywords may be rendered using the same rendering method as in the certain point. With the above CSS rendering plan as an example, if the user stops the rendering of the frame at the 3rd second where the frame is rendered with CSS 2 (black and white), then the subsequent frames in the video with same features may be rendered with CSS 2 (black and white) directly.

The rendering process will end at block 690 if it's decided at the block 680 that there is no more frame in the video to be rendered.

With the method as described above, even for the same media content, different rendering plans may be generated for different users according to different user profiles.

The possible visual effect for an image or a frame in a video may be different for different category of information. According to embodiments of the present invention, visual effects accepted by most people or visual effects that work for people may be used to decrease the possible emotion effects on the viewer.

For those horror movies, the vague mode or the mosaics are widely used and accepted by people. A regional vague or mosaic change may be applied to the horror images. The scope of the region may be changed based on people's profiles about their willingness to see a horror thing. The scope or the clearness of the vagueness or mosaics effect can be progressively changed.

For pictures of food, from the big data analytics, we can know what filter/visual effect people usually use for food to win "likes" from friends in social media. For example, after people post a picture of food on Instagram®, it may be analyzed which filter/visual effect is most welcomed by audience to show their interests in food. Instagram® is a registered trademarks of Instagram, LLC. The visual effects/filters may have some values in lightness, color contrast, or some other filters that work opposite to those work well. To be specific, some values may be lowered, while others may be increased to make the visual effects become less welcomed by people who are willing to eat the food.

Which pictures to apply the progressive rendering? It may be decided by the video/graphic content provider. It may be automatically detected by algorithms, psychology statistics, visitor's comments, etc. It may also be pre-defined by the user. The rendering plan may be refined automatically based on the user's history operation.

Although the embodiments of the present invention have been described by using image and video as examples of a media content, it would be understood that the embodiments of the present invention may also be applied to other media content, such as web pages, audio, etc. Using the audio content as an example, a progressive rendering plan for an audio may be, for example, muting the sound of the audio, playing the audio with the sound volume from low to high, etc.

Under the same inventive concept, another embodiment of the present invention can provide a computer system for processing a media content. The system may comprise one or more processors, a memory coupled to at least one of the processors, and a set of computer program instructions stored in the memory and executed by at least one of the processors in order to perform actions of, receiving a request from a user to render a media content, identifying one or more features of the media content, obtaining a profile of the user, and generating a progressive rendering plan for the media content based on the user's profile and the one or more features of the media content.

Under the same inventive concept, another embodiment of the present invention can provide a computer program product for processing a media content. The computer program product may comprise a computer readable storage medium having program instructions embodied therewith, the program instructions readable by a device to cause the device to perform a method comprising, receiving a request from a user to render a media content, identifying one or more features of the media content, obtaining a profile of the user, and generating a progressive rendering plan for the media content based on the user's profile and the one or more features of the media content.

It should be noted that the method and system of media content processing according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a request from a user to render a video on a user device, wherein the video comprises a sequence of frames;
obtaining a profile of the user, wherein the profile comprises subjects liked by the user and subjects disliked by the user;
identifying the subjects disliked by the user in the sequence of frames of the video based on determining features appearing in the sequence of frames of the video matching a subject disliked by the user;
modifying a set of sequentially displayed frames of the sequence of frames having the identified subjects disliked by the user by changing display characteristics affecting how the set of sequentially displayed frames is displayed on the user device, wherein changing the display characteristics comprises sequentially
inverting colors of a first group of the set,
converting a second group of the set to black and white, and
converting a third group of the set to a low contrast version,
wherein a number of frames in each of the first group, the second group and the third group is initially based on a predetermined number and adjusted subsequently based on user feedback;
displaying the video on the user device comprising the modified set of frames, wherein the modified set of frames is displayed in place of the set of frames of the video having the identified subjects disliked by the user;
in response to receiving a request from the user to stop changing the display characteristics, displaying the video without modification;
in response to receiving a request from the user to suspend changing the display characteristics, displaying the set of frames of the video having the identified subjects disliked by the user as modified at the time of receiving the user's request to suspend changing the display characteristic;
in response to receiving a request from the user to resume changing the display characteristics, resume changing the display characteristics sequentially; and
using machine learning to update subjects liked by the user, the subjects disliked by the user, and a preferred modification of the video having the identified subjects, in the profile of the user based on the received stop, suspend and resume requests.

2. The method of claim 1, wherein obtaining the profile of the user further comprises:
updating the profile of the user based on the user's activities in social media.

3. The method of claim 1, wherein the determining features in the sequence of frames of the video are identified by identifiers for human emotions, descriptions of subjects shown, tags attached to frames of the video, and content recognition technology.

4. The method of claim 1, comprising
further modifying audio of the modified set of frames of the video having the identified subjects disliked by the user by changing sound characteristics while the modified set of frames are displayed on the user device, wherein changing the sound characteristics comprises sequentially
muting sounds of the first group of the frames modified set,
varying volume of sounds of the second group of the frames modified set, and
lowering sounds of the third group of the frames modified set;
displaying the video on the user device comprising the further modified set of frames, wherein the further modified set of frames are displayed in place of the modified set of frames of the video having the identified subjects disliked by the user.

5. A computer-implemented method comprising:
receiving a request from a user to render a video on a user device, wherein the video comprises a sequence of frames;
obtaining a profile of the user, wherein the profile comprises subjects liked by the user and subjects disliked by the user;
identifying a first subject disliked by the user in the sequence of frames of the video based on determining features appearing in the sequence of frames of the video matching the first subject of the subjects disliked by the user;
modifying a first set of sequentially displayed frames of the sequence of frames having the first subject by changing display characteristics affecting how the first set of sequentially displayed frames is displayed on the user device, wherein changing the display characteristics comprises sequentially
inverting colors of a first group of the frames first set,
converting a second group of the first set to black and white, and
converting a third group of the frames first set to a low contrast version,
wherein a number of frames in each of the first group, the second group and the third group is initially based on a predetermined number and adjusted subsequently based on user feedback;
displaying the video on the user device comprising the modified first set of frames, wherein the modified first set of frames are is displayed in place of the first set of frames of the video having the first subject;
in response to receiving a request from the user to stop changing the display characteristics, displaying the first set without modification;
in response to receiving a request from the user to suspend changing the display characteristics, displaying the first set of frames of the video having the identified first subject disliked by the user as modified at the time of receiving the user's request to suspend changing the display characteristic;
in response to receiving a request from the user to resume changing the display characteristics, resume changing the display characteristics sequentially; and
using machine learning to update the profile of the user based on the received stop, suspend and resume requests for the first set of frames of the video comprising the first subject.

6. The method of claim 5, further comprising:
identifying a second subject disliked by the user in the sequence of frames of the video based on determining features appearing in the sequence of frames of the video matching the second subject of the subjects disliked by the user, wherein the second subject is different than the first subject;

modifying a second set of sequentially displayed frames of the sequence of frames having the second subject by changing display characteristics affecting how the second set of sequentially displayed frames is displayed on the user device, wherein changing the display characteristics comprises sequentially inverting colors of a first group of the second set, converting a second group of the second set to black and white, and converting a third group of the second set to a low contrast version, wherein a number of frames in each of the first group of the second set, the second group of the second set and the third group of the second set is initially based on a predetermined number and adjusted subsequently based on user feedback;

displaying the video on the user device comprising the modified second set of frames, wherein the modified second set of frames is displayed in place of the second set of frames of the video having the second subject;

in response to receiving a request from the user to stop changing the display characteristics affecting how the second set is displayed, displaying the second set without modification;

in response to receiving a request from the user to suspend changing the display characteristics affecting how the second set is displayed, displaying the second set of frames of the video having the second subject disliked by the user as modified at the time of receiving the user's request to suspend changing the display characteristic affecting how the second set is displayed;

in response to receiving a request from the user to resume changing the display characteristics affecting how the second set is displayed, resume changing the display characteristics affecting how the second set is displayed sequentially; and using machine learning to update subjects liked by the user, the subjects disliked by the user, and a preferred modification of the video having the identified subjects, in the profile of the user based on the received stop, suspend and resume requests for different subjects.

7. The method of claim 5, wherein obtaining a profile of the user further comprises:

updating the profile of the user based on the user's activities in social media.

8. The method of claim 5, wherein the features in the sequence of frames of the video are identified by identifiers for human emotions, descriptions of subjects shown, tags attached to frames of the video, and content recognition technology.

9. The method of claim 5, comprising further modifying audio of the modified first set of frames of the video having the first subject by changing sound characteristics while the modified first set of frames is displayed on the user device, wherein changing the sound characteristics comprises sequentially muting sounds of the first group of the modified first set, varying volume of sounds of the second group of the modified first set, and lowering sounds of the third group of the modified first set;

displaying the video on the user device comprising the further modified first set of frames, wherein the further modified first set of frames is displayed in place of the modified first set of frames of the video having the first subject.

10. A computer-implemented method comprising:

receiving a request from a user to render a video on a user device, wherein the video comprises a sequence of frames;

obtaining a profile of the user, wherein the profile comprises subjects liked by the user and subjects disliked by the user;

identifying the subjects disliked by the user in the sequence of frames of the video based on determining features appearing in the sequence of frames of the video matching a subject disliked by the user;

modifying a set of sequentially displayed frames of the sequence of frames having the identified subjects disliked by the user by changing display characteristics affecting how the set of sequentially displayed frames are displayed on the user device, wherein changing the display characteristics comprises sequentially varying a vagueness of a first group of the set and converting a second group of the set with a photo mosaic change, wherein a number of frames in each of the first group and the second group is initially based on a predetermined number and adjusted subsequently based on user feedback;

displaying the video on the user device comprising the modified set of frames, wherein the modified set of frames is displayed in place of the set of frames of the video having the identified subjects disliked by the user;

in response to receiving a request from the user to stop changing the display characteristics, displaying the video without modification;

in response to receiving a request from the user to suspend changing the display characteristics, displaying the set of frames of the video having the identified subjects disliked by the user as modified at the time of receiving the user's request to suspend changing the display characteristic;

in response to receiving a request from the user to resume changing the display characteristics, resume changing the display characteristics sequentially; and using machine learning to update subjects liked by the user, the subjects disliked by the user, and a preferred modification of the video having the identified subjects, in the profile of the user based on the received stop, suspend and resume requests.

11. The method of claim 10, wherein obtaining a profile of the user further comprises:

updating the profile of the user based on the user's activities in social media.

12. The method of claim 10, wherein the features in the sequence of frames of the video are identified by identifiers for human emotions, descriptions of subjects shown, tags attached to frames of the video, and content recognition technology.

13. The method of claim 10, comprising further modifying audio of the modified set of frames of the video having the identified subjects disliked by the user by changing sound characteristics while the modified set of frames are displayed on the user device, wherein changing the sound characteristics comprises sequentially
muting sounds of the first group of the modified set, and varying volume of sounds of the second group of the modified set;
displaying the video on the user device comprising the further modified set of frames, wherein the further modified set of frames are displayed in place of the modified set of frames of the video having the identified subjects disliked by the user.

\* \* \* \* \*